United States Patent
Carlson et al.

(10) Patent No.: US 10,952,422 B1
(45) Date of Patent: Mar. 23, 2021

(54) ICE FISHING JIG

(71) Applicants: William Roy Carlson, Wasilla, AK (US); Stephen C. Walo, Jr., Wasilla, AK (US)

(72) Inventors: William Roy Carlson, Wasilla, AK (US); Stephen C. Walo, Jr., Wasilla, AK (US)

(*) Notice: Subject to any disclaimer, the term of this patent is extended or adjusted under 35 U.S.C. 154(b) by 204 days.

(21) Appl. No.: 16/141,004

(22) Filed: Sep. 25, 2018

(51) Int. Cl.
*A01K 97/01* (2006.01)
*A01K 97/12* (2006.01)
*A01K 89/08* (2006.01)
*A01K 85/00* (2006.01)

(52) U.S. Cl.
CPC .............. *A01K 97/01* (2013.01); *A01K 89/08* (2013.01); *A01K 97/12* (2013.01); *A01K 85/00* (2013.01)

(58) Field of Classification Search
CPC ...... A01K 91/065; A01K 91/10; A01K 97/12; A01K 97/00; A01K 97/01; A01K 97/125
USPC .................................... 43/19.2, 15, 17, 16, 4
See application file for complete search history.

(56) References Cited

U.S. PATENT DOCUMENTS

| | | | | | |
|---|---|---|---|---|---|
| 2,502,231 | A * | 3/1950 | Oberg | .................... | A01K 97/01 43/17 |
| 2,624,972 | A * | 1/1953 | Burg | ...................... | A01K 97/01 43/17 |
| 2,732,649 | A * | 1/1956 | Tuttle | .................... | A01K 97/01 43/17 |
| 2,785,493 | A * | 3/1957 | Thiel | ..................... | A01K 97/125 43/17 |
| 3,134,188 | A * | 5/1964 | Petersen | ................. | A01K 97/01 43/17 |
| 3,163,954 | A * | 1/1965 | Ludmilla | ............... | A01K 97/01 43/17 |
| 3,187,456 | A * | 6/1965 | Apitz | ..................... | A01K 97/01 43/17 |
| 3,568,352 | A * | 3/1971 | Hill | ....................... | A01K 91/065 43/17 |
| 3,641,693 | A * | 2/1972 | Pinnow | .................. | A01K 97/01 43/17 |
| 3,727,342 | A * | 4/1973 | Lindsey, Jr. | .......... | A01K 97/01 43/17 |
| 4,030,223 | A * | 6/1977 | Loesch | .................. | A01K 97/12 43/15 |
| 4,373,287 | A * | 2/1983 | Grahl | .................... | A01K 97/01 43/17 |
| 4,685,240 | A * | 8/1987 | Fralick | .................. | A01K 97/01 43/16 |
| 4,790,099 | A * | 12/1988 | Miller, Jr. | ............. | A01K 97/01 43/17 |

(Continued)

*Primary Examiner* — Magdalena Topolski
*Assistant Examiner* — Shada Mohamed Alghailani
(74) *Attorney, Agent, or Firm* — Michael J. Tavella

(57) ABSTRACT

A jigging device that has a disk base and a pivot arm that has a sail attached. The pivot arm is attached to the pivot support. The pivot arm moves about a pivot assembly, moved by the wind. The sail is attached to the end of the pivot arm. At the other end, is a clip release. Fishing line, fed by a spool, passes through the disk and up to the clip release. The line is held there until sufficient downward force releases it from the clip. The line passes back down through the disk. A lure is attached to the end of the line. The lure is suspended in the water under the ice. The wind moves the pivot arm up and down, which causes the line and, consequently; the lure to move in sync with the pivot arm, thereby jigging the lure.

16 Claims, 11 Drawing Sheets

(56) References Cited

U.S. PATENT DOCUMENTS

| | | | | |
|---|---|---|---|---|
| 4,823,494 | A * | 4/1989 | Waterman | A01K 97/01 43/16 |
| 4,862,627 | A * | 9/1989 | Keller | A01K 97/01 43/17 |
| 4,993,182 | A * | 2/1991 | Monsen | A01K 97/01 43/17 |
| 5,067,269 | A * | 11/1991 | Eppley | A01K 97/01 43/17 |
| 5,074,072 | A * | 12/1991 | Serocki | A01K 97/01 43/16 |
| 5,101,591 | A * | 4/1992 | Frazier | A01K 97/01 43/17 |
| 5,154,015 | A * | 10/1992 | Pecard | A01K 97/01 43/4 |
| 5,896,694 | A * | 4/1999 | Midha | A01K 97/01 43/17 |
| 5,903,998 | A * | 5/1999 | Hawkins | A01K 97/11 43/15 |
| 6,354,036 | B1 * | 3/2002 | Carlson | A01K 97/01 43/17 |
| 6,401,380 | B1 * | 6/2002 | McGonigal, Jr. | A01K 91/065 43/19.2 |
| 6,646,557 | B2 * | 11/2003 | Brake | A01K 97/10 340/573.2 |
| 6,651,373 | B2 * | 11/2003 | Harris | A01K 97/01 43/19.2 |
| 6,836,993 | B1 * | 1/2005 | Austin | A01K 97/01 43/27.2 |
| 6,898,892 | B2 * | 5/2005 | Senckowski | A01K 97/01 43/16 |
| D522,608 | S * | 6/2006 | Gosciak | D22/134 |
| 7,207,133 | B2 * | 4/2007 | Schiemann | A01K 97/01 43/17 |
| 7,818,913 | B1 * | 10/2010 | Hoglund | A01K 97/01 43/17 |
| 8,701,333 | B2 * | 4/2014 | Christianson | A01K 97/01 43/17 |
| 8,832,989 | B2 * | 9/2014 | Martinella | A01K 97/01 43/15 |
| 8,931,203 | B2 * | 1/2015 | Baugh | A01K 99/00 43/15 |
| 9,095,130 | B2 * | 8/2015 | Coulson | A01K 97/01 |
| D788,255 | S * | 5/2017 | Rayfield | D22/137 |
| 9,955,681 | B1 * | 5/2018 | Yang | A01K 97/12 |
| 10,653,125 | B2 * | 5/2020 | Mann | A01K 97/12 |
| 10,709,123 | B2 * | 7/2020 | Faulks | G06F 3/03547 |
| 2002/0139033 | A1 * | 10/2002 | Scherg | A01K 97/01 43/17 |
| 2003/0145508 | A1 * | 8/2003 | Pieczynski | A01K 97/01 43/17 |
| 2004/0003532 | A1 * | 1/2004 | Shaff | A01K 97/01 43/17 |
| 2004/0237374 | A1 * | 12/2004 | Klein | A01K 97/01 43/21.2 |
| 2007/0227057 | A1 * | 10/2007 | Holmberg | A01K 97/01 43/17 |
| 2008/0052981 | A1 * | 3/2008 | Richardson | A01K 97/11 43/17 |
| 2009/0094878 | A1 * | 4/2009 | Dungan | A01K 97/11 43/15 |
| 2009/0151218 | A1 * | 6/2009 | Woodhouse | B63B 35/00 43/8 |
| 2009/0165354 | A1 * | 7/2009 | Rand | A01K 97/01 43/17 |
| 2009/0272022 | A1 * | 11/2009 | Grega | A01K 97/01 43/17 |
| 2011/0049315 | A1 * | 3/2011 | Buckbee | A01K 97/00 248/219.4 |
| 2011/0107652 | A1 * | 5/2011 | Getzinger | A01K 91/065 43/19.2 |
| 2012/0246994 | A1 * | 10/2012 | Katz | A01K 97/01 43/4 |
| 2012/0266516 | A1 * | 10/2012 | White | A01K 97/01 43/4.5 |
| 2012/0285070 | A1 * | 11/2012 | Beayon | A01K 97/01 43/16 |
| 2012/0291332 | A1 * | 11/2012 | Nolf | A01K 97/01 43/17 |
| 2014/0068995 | A1 * | 3/2014 | Galbraith | A01K 97/01 43/17 |
| 2014/0090287 | A1 * | 4/2014 | Olson | A01K 97/12 43/17 |
| 2016/0120161 | A1 * | 5/2016 | Aiello | A01K 97/01 43/16 |
| 2017/0064937 | A1 * | 3/2017 | Christianson | A01K 97/01 |
| 2017/0265446 | A1 * | 9/2017 | Dungan | A01K 97/12 |
| 2020/0022351 | A1 * | 1/2020 | McCarter | A01K 97/01 |

* cited by examiner

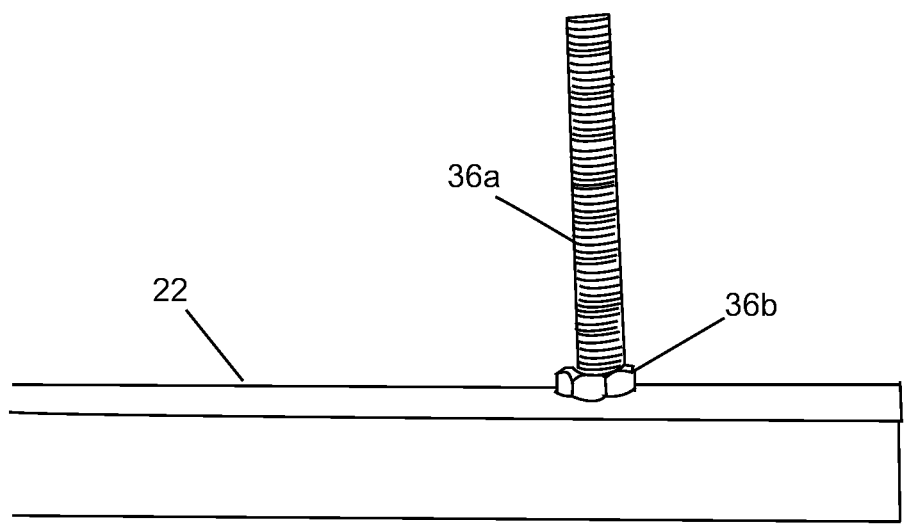
Figure 13
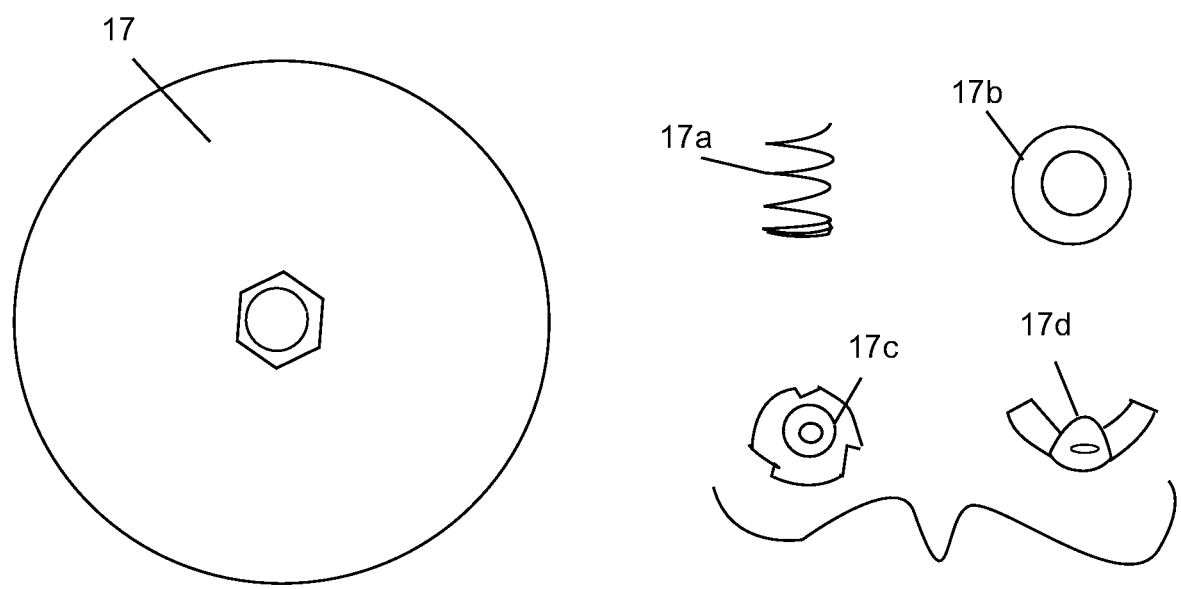
Figure 14
Figure 15

ICE FISHING JIG

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to ice fishing jigs and particularly to ice fishing jigs utilizing a wind sail.

2. Description of the Prior Art

Ice Fishing is a popular winter activity. It frequently requires long periods of sitting on the ice working or "jigging" a fishing pole to attract fish. Over the years, people have developed ways in which this process is automated, which allows the fisher-persons to remain warm in their shelter until a fish is caught. To that end, several devices have been patented. A number of these are for jigging devices that are not limited to ice fishing. Some examples are found in the following U.S. Pat. Nos. 3,568,352, 4,077, 149, and 5,570,534. U.S. Pat. No. 5,050,333 teaches a device for ice fishing that uses a rod secured to a frame above the ice. Although it does not jig, it does have a notification flag that alerts a user that a fish is on the line. The last patent is an example of an above-ice reel (or spool). The use of above-ice spools has largely been abandoned by ice fishers because, after a short time, the retrieved line freezes on the reel. To prevent this, ice fishers generally submerge the reel. U. S. Patent Application No. 2016/0366869 teaches a framework that is positioned over a hole in the ice. The spool is disposed under water. An alarm flag is attached to the frame to alert the user a fish is on the line. However, this device does not jig. U.S. Pat. No. 2,122,836 teaches a device that has a round base to fit over a hole in the ice. A set of wind cones is attached to a frame above the surface of the water. A shaft, attached to the cones extends down below the water surface. A swivel is attached at the bottom of the shaft, which is then attached to an anchor. An arm is attached to the shaft below the surface. At the end of the arm, a lure is attached. Now, as the wind blows, the lure is moved around in a circle to attract fish. There is no spool or alarm with this device, and it does not jig. U.S. Pat. No. 2,693,046 teaches a device that has a submerged spool. Above the spool is a cylinder that is spring-loaded. A flag is stored in the cylinder and when a fish is caught, the flag pops up, alerting the user that a fish is in the line. This device does not jig. Another wind-driven device is found in U.S. Pat. No. 3,599,369. This device has a tripod style frame that sits above an ice fishing hole. The device has a crank system attached to a set of wind cones. This crank system converts the rotation of the wind cones into vertical motion to effect jigging in the fishing line. However, in this system, the reel is above the water and subject to freezing. Another wind-driven device that is not limited to ice fishing is found in U.S. Pat. No. 6,021,596, which is a device that uses a bucket that has a spool attached. A wind-driven crank is used to provide the jigging. Although this device is useful for jigging, the reel is above the water, making it prone to freezing. Finally, U.S. Pat. No. 2,976,640 teaches yet another wind-driven ice fishing jigger. This device has a base frame that is positioned adjacent to an ice fishing hole. An operating arm has a first end, to which as shaft is attached. The shaft has a spool attached that is kept below the water level. The other end of the operating arm is attached to a small square sail. A center pivot allows the operating arm to raiser and lower as the wind moves the sail. In this way, the device moves the spool up and down, to produce jigging. Some problems exist with this device. First, the reel acts as a counter weight to the sail. Second, the frame is placed beside the hole. It cannot be placed over the hole because the spool end of the operating arm must be over the hole. Of course, one problem with ice fishing is that holes can freeze over if not maintained. There is little here other than the motion of the reel to keep the hole from freezing over. Finally, using the reel as the counter weight limits the ability to set the rig of this device. Essentially, the line must descend from the submerged reel. There is no way to produce a quick release setup to ensure a well-set hook.

BRIEF DESCRIPTION OF THE INVENTION

The instant invention overcomes all of the above difficulties. It is a jigging device that is powered by the wind. It has a heavy duty, but very light action wind powered jigging tip-up device. It operates from 0 mph to 40 mph and includes storm sails if necessary.

The device consists of two main components: a disk base and a pivot arm that has a sail attached. The pivot arm is attached to the pivot support at point. In this way, the pivot arm moves about the point, which is the pivot assembly, moved by the wind. The sail is attached to the end of the pivot arm. At the other end, is a clip release. Fishing line, fed by a spool, passes through the disk and up to the clip release. The line is held there until sufficient downward force releases it from the clip. The line passes back down through the disk. A lure is attached to the end of the line. The lure is suspended in the water under the ice. With this set-up, the wind moves the pivot arm up and down, which causes the line and, consequently, the lure to move in sync with the pivot arm, thereby jigging the lure. Note that this system is much better that a crank/eccentric jigger because the action of the wind is truly random, whereas the crank systems run like clockwork.

The device is simple; it has only one actuating spring, which is a "return to neutral" spring and is not adjustable other than for side tension using a wing nut.

The device can also be operated by touch, if desired. The device is also designed to react to the water pressure differential caused by passing fish.

Lure weight adjustment is by counter weight (balance). The weight is easily adjustable from 0 to 1 ounce. Additional counter-weights for larger lures may be attached to the device as needed. The device has a unique mounting platform (disk) that keeps hole warm. It also keeps snow out of the hole. A Plexiglas panel allows user to see the spool and allows diffused light down the hole. Moreover, it is also useful when using live fish as bait (where legal) because the panel allows the user to see what the bait is doing.

The disk is painted black (except for the viewing ports) above the ice for visibility and heat absorption, and painted white/blue on base for low visibility. The disk can be used in 6, 8 or 10 inch holes by simply changing the length of the chatter stick.

A spring clip is available for easy setting, using Dacron or heavy line. When using monofiliment line, a clothes pin assembly or down rigger clip may be used.

All adjustments are on one side for convenience. The device folds for easy storage. It uses common hardware for repairs and maintenance. The device can be used with a fishing rod too, by removing the spool assembly using the vinyl bypass if necessary.

Strikes are indicated by movement or when the fishing line is no longer visible. A flagging ribbon etc. may be tied to line, or a rubber band can be used for easy setting in the clothes pin or down rigger clip.

BRIEF DESCRIPTION OF THE DRAWINGS

FIG. 13 is a detail of the reel arm with the reel removed.

FIG. 14 is a front view of the reel.

FIG. 15 is a detail of the reel mounting hardware.

DETAILED DESCRIPTION OF THE INVENTION

Figure 1:
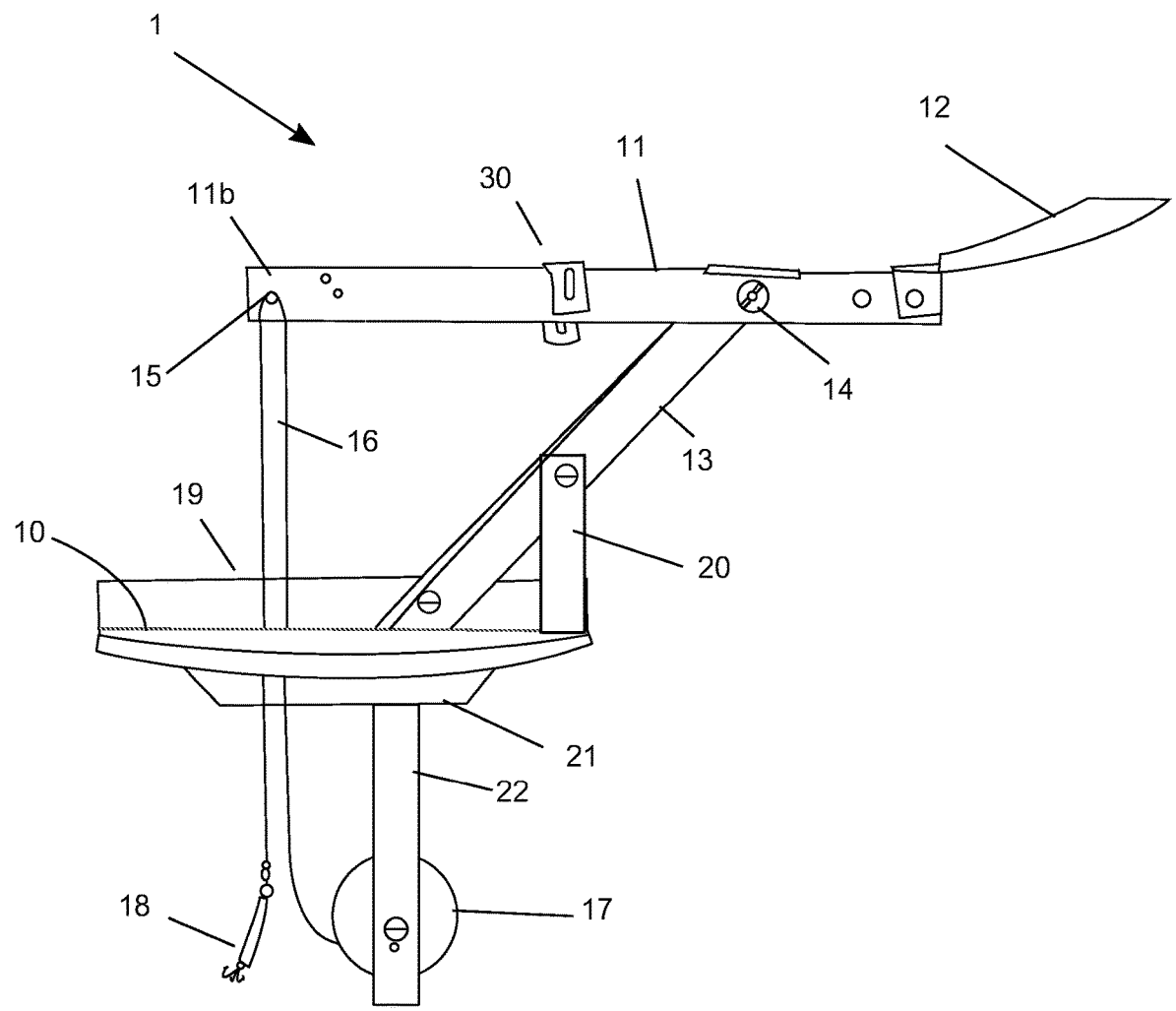
FIG. 1 is a side view of the invention open for use.
Figure 2:
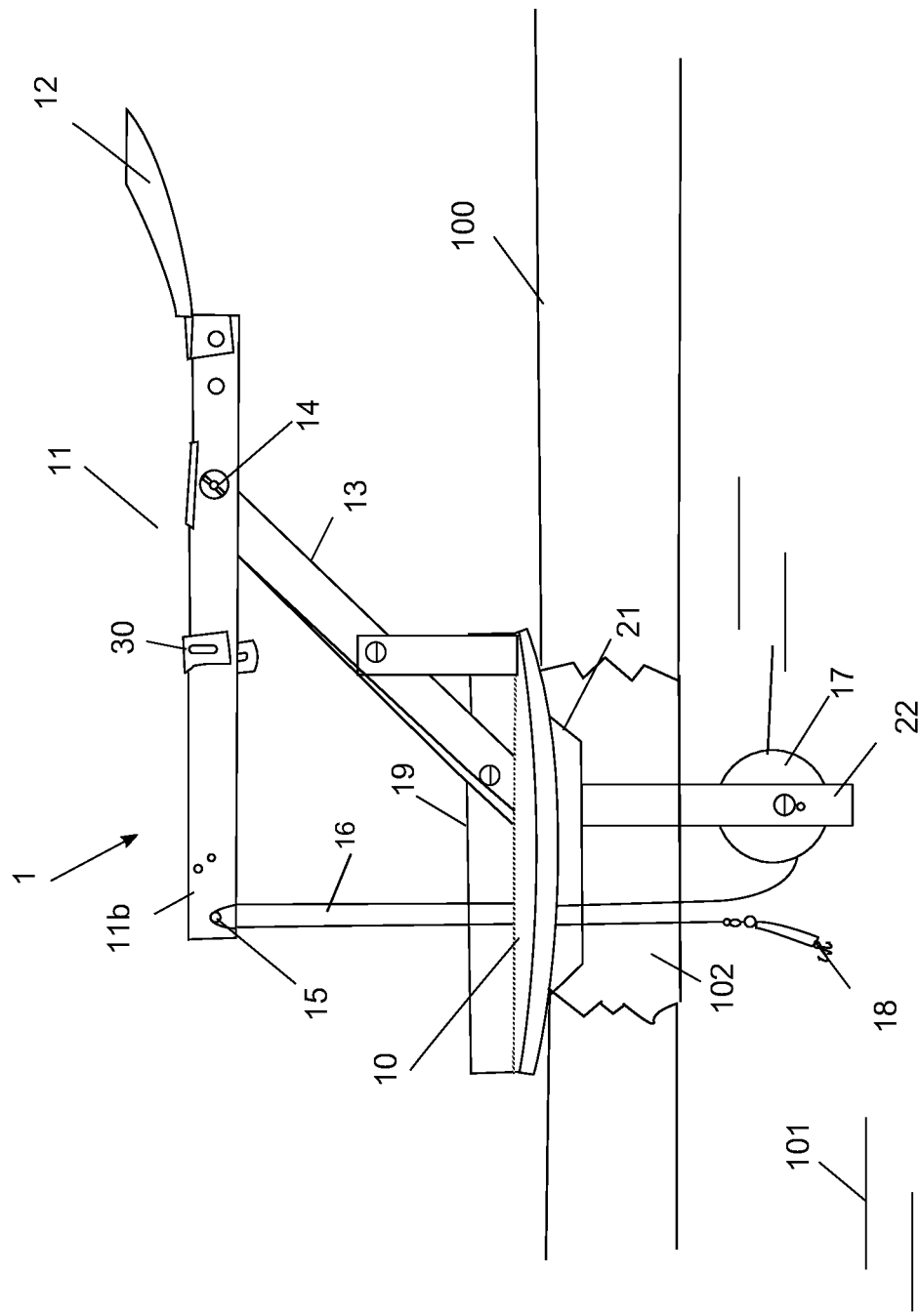
FIG. 2 is a side detail view of the invention on the ice, positioned over a hole for fishing.
Figure 3:
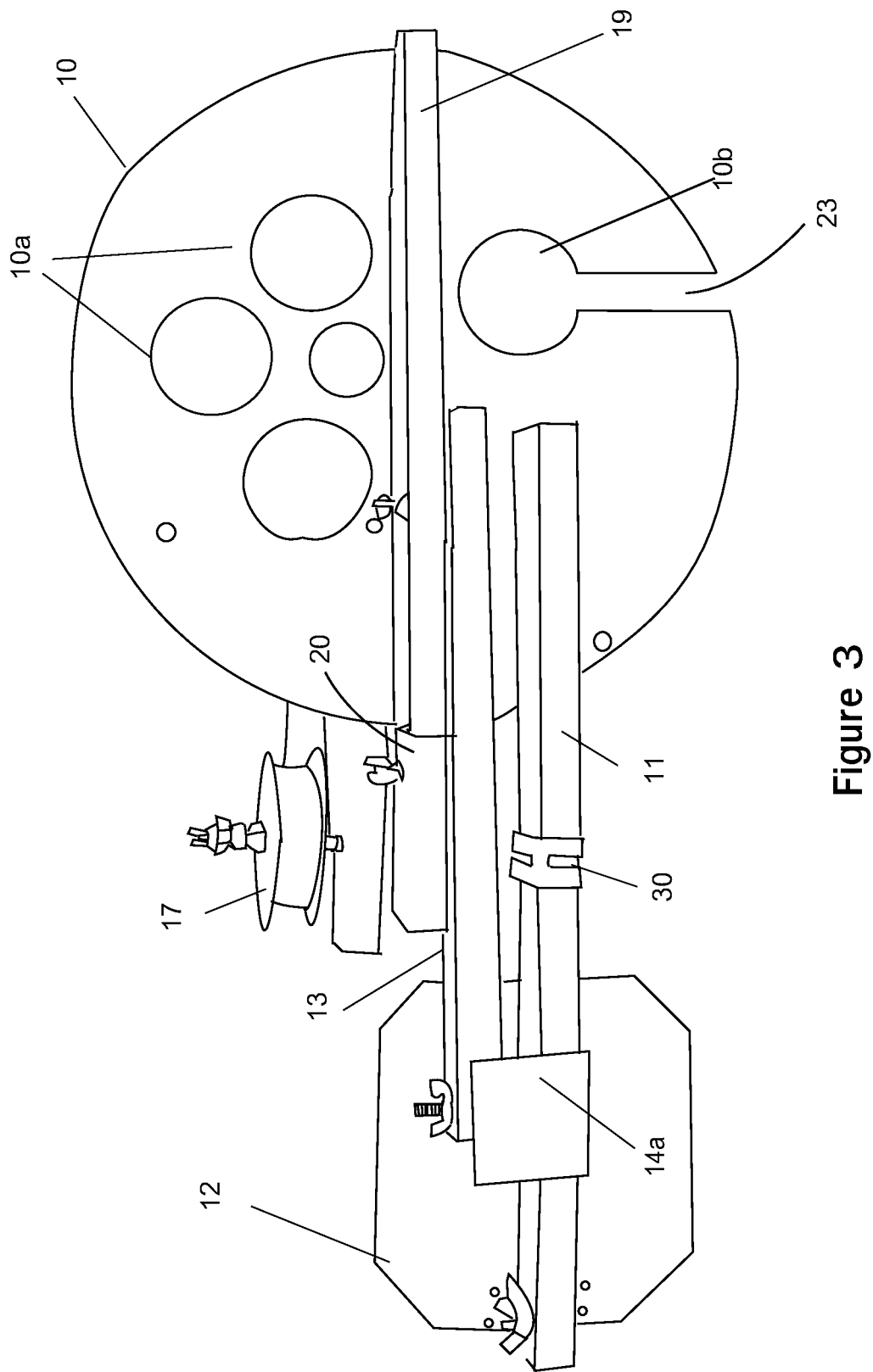
FIG. 3 is a top view of the device closed for storage.

Referring now to the drawings and particularly to FIGS. 1, 2, 3 and 3a, FIG. 1 is a side view of the invention open for use. FIG. 2 is a side detail view of the invention on the ice, positioned over a hole for fishing. FIG. 3 is a bottom view of the device closed for storage.

The device 1 consists of two main components: a disk base 10 and a pivot arm 11 that has a sail 12 attached. The pivot arm is attached to a pivot support 13 at point 14. In this way, the pivot arm 11 moves about the point 14, which is the pivot assembly, moved by the wind. The sail 12 is attached to the distal end 11a of the pivot arm 11. At the proximate end, 11b is a clip release 15. Fishing line 16, fed by a spool 17 passes through the disk 10 and up to the clip release 15 as shown. The line is held there until sufficient downward force releases it from the clip, as discussed below. The line 16 passes back down through the disk 10 as shown. A lure, 18 is attached to the end of the line. The lure is suspended in the water under the ice (see FIG. 2). With this set-up, the wind moves the pivot arm 11 up and down, which causes the line 16 and, consequently, the lure 18 to move in sync with the pivot arm, thereby jigging the lure. Note that this system is much better that a crank/eccentric jigger because the action of the wind is truly random, whereas the crank systems run like clockwork.

At the top of the disk 10 is a frame piece 19 to which the pivot support 13 is attached. Note that the pivot support 13 is also attached to a second support 20. This support hold the pivot support 13 in position when the device is open, as shown. It also allows the device to be easily folded for storage, as discussed below.

The disk base 10 is painted black (except for the viewing ports) above the ice for visibility and heat absorption, and painted white/blue on the disk base for low visibility.

Below the disk 10 is a chatter stick 21 that supports the spool support 22. It also fits within the hole, and is changeable to fit smaller or larger diameter holes, as discussed below. The spool 17 is attached to the spool support 22. Note that the spool support is pivotably attached to the chatter stick so that it can be folded for storage as well.

FIG. 2 is a side detail view of the invention on the ice, positioned over a hole for fishing. Here, the device 1 is shown. In this view, the device 1 is identical to that of FIG. 1. The difference being that it is now shown in the environment. The device 1 is shown one ice 100, which is above water 101. Note that the device fits into a hole 102 formed in the ice. Note too, that the chatter stick 21 fits the width of the hole by changing the chatter stick. As noted above, in the preferred embodiment, the device is designed to be using in 6, 8 or 10 inch holes by changing the length of the chatter stick 21.

FIG. 3 is a top view of the device folded for storage. Here, the disk 10 is shown. Note the openings 10a, which are openings in the paint on the Plexiglas that provide light and visual access to the water below. These openings are not open holes. The central hole 10b is a hole that is used for the line to pass through. The spool 17 is shown mounted to the spool support 22, that folds up against the chatter strip 21 (see FIG. 3a). The frame piece 19 is shown with the pivot support 13 shown folded against the frame piece 19, with the second support 20 in front of it. The pivot arm 11 is shown on the outside. Note the sail 12 is folded against the pivot arm 11 and the pivot support 13. Details of the attachment of the sail are discussed below. Note that this figure also shows the preferred feed through slot 23.

Figure 3A:
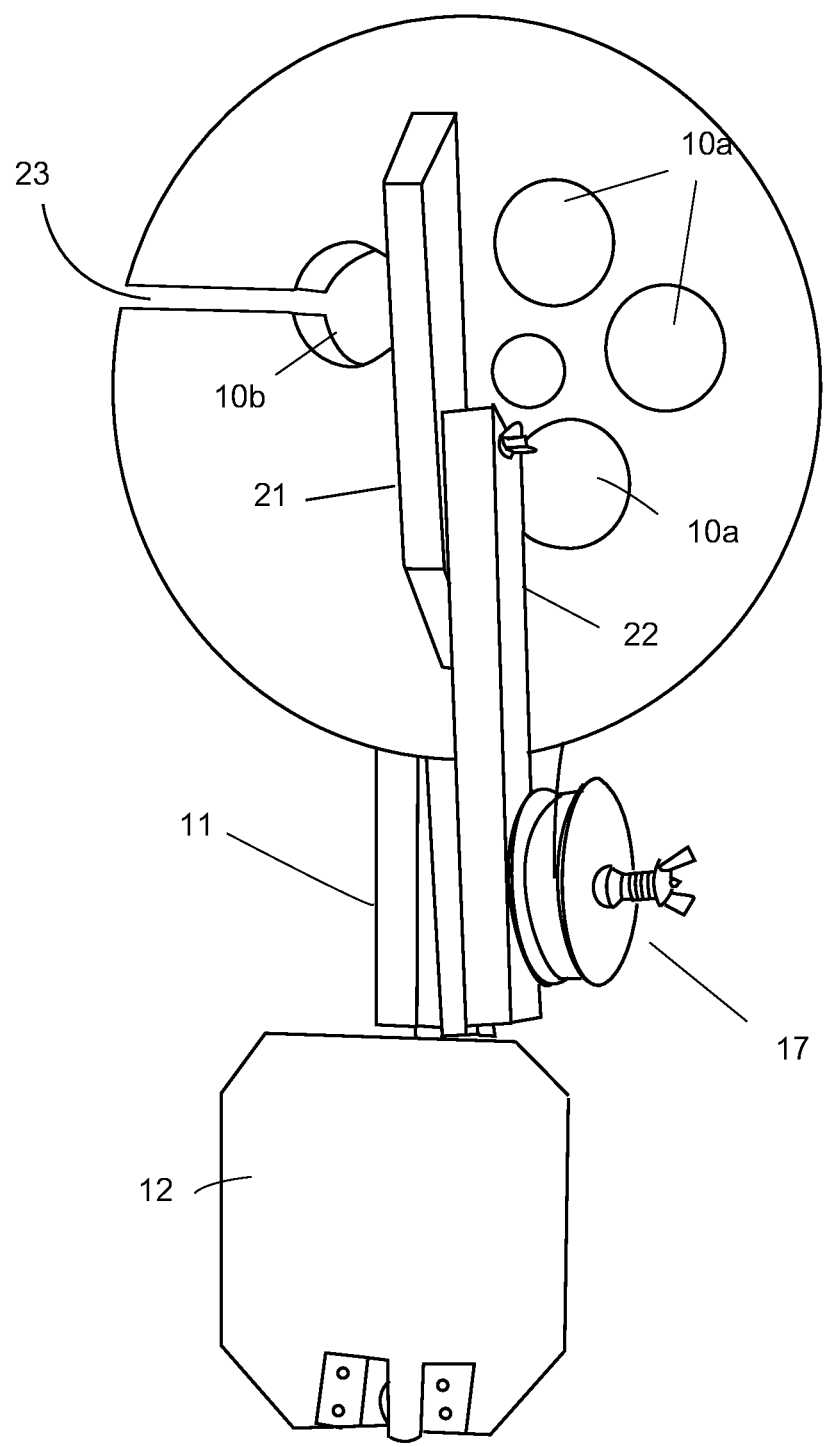
FIG. 3a is a bottom view of the device folded for storage.

FIG. 3a is a bottom view of the device closed for storage. As noted above, the device folds for storage and for easier carrying. Here, the disk 10 is shown. Note the openings 10a, which are openings in the paint on the Plexiglas that provide light and visual access to the water below. These openings are not open holes. The central hole 10b is a hole that is used for the line to pass through. Note the position of the chatter stick 21 is shown in the center of the disk. Note too that this figure shows the feed-through slot location 23 that allows the line to be fed into, or out of, the hole 10b. This feature is discussed in more detail below. Note the spool support 22 and the spool 17. Note too, the pivot arm 11 and the sail 12 also folded.

Figure 4:
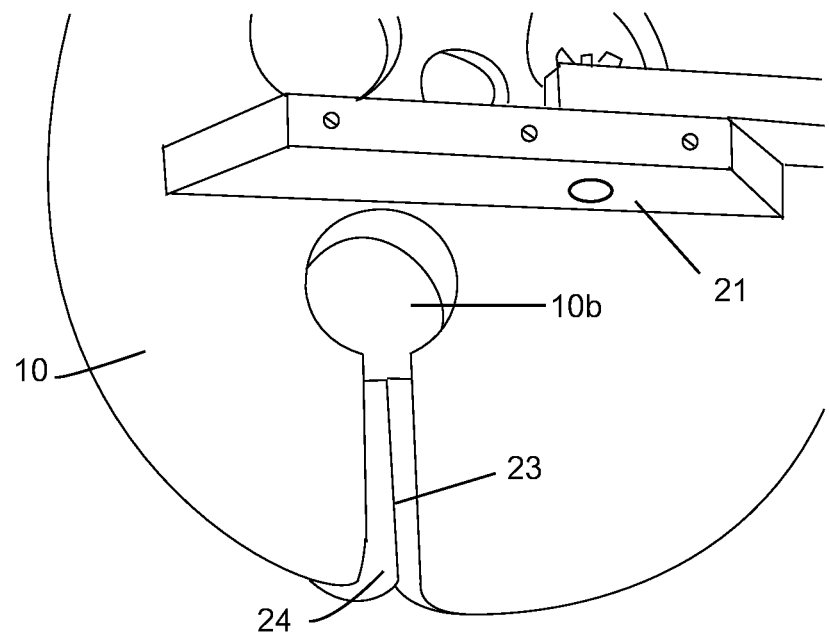
FIG. 4 is a bottom plan view of a portion of the disk showing the feed-through slot.
Figure 5:
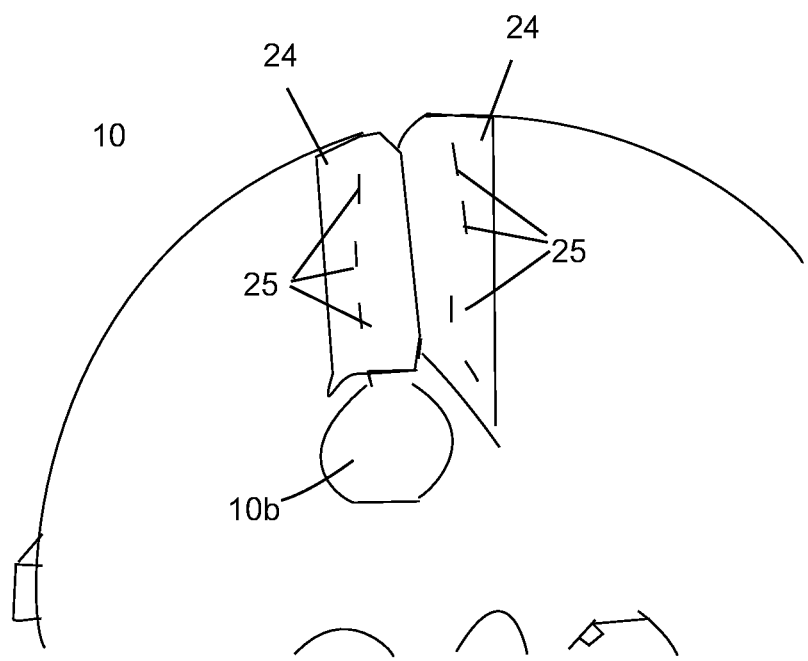
FIG. 5 is a detail view of a portion of the disk showing the covered feed-through slot.

FIG. 4 is a bottom plan view of a portion of the disk showing the feed-through slot 23. FIG. 5 is a detail view of a portion of the disk showing the covered feed-through slot 23. In these figures the disk 10 is shown with the feed-through slot 23 clearly shown. As noted above, the slot allows the line, fish and the spool to be easily removed. It also allows for the use of a fishing pole, if desired. To protect the hole, the feed-through slot 23 is covered by a nylon or vinyl cover 24. That is wrapped around both sides of the opening 23. The cover 24 can be secured to the disk 10 with glue or staples, or a similar fastener 25, as shown in FIG. 5

Figure 6:
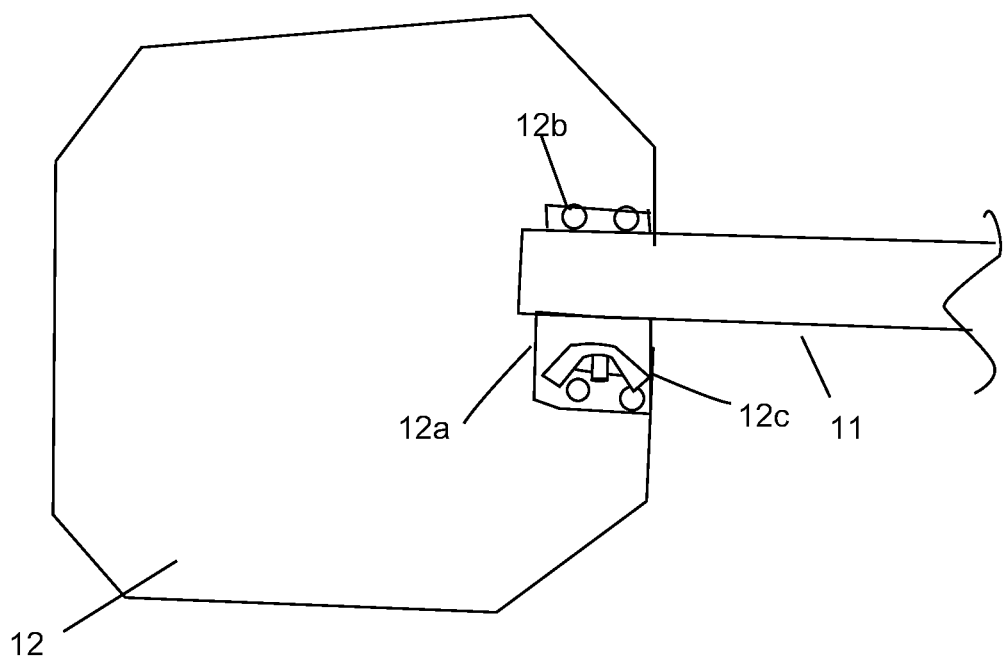
FIG. 6 is a bottom detail view of the sail.
Figure 7:
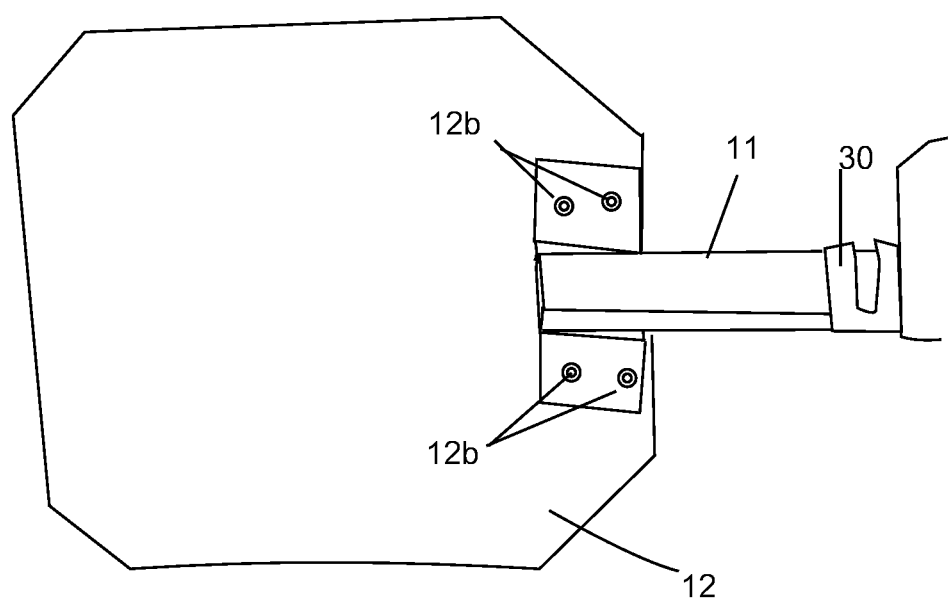
FIG. 7 is a top detail view of the sail.

FIG. 6 is a bottom detail view of the sail 12 and FIG. 7 is a top detail view of the sail 12. The sail 12, in the preferred embodiment is made of galvanized sheet metal and is 6 inches by 6.5 inches. The sail 12 has clipped corners, as shown. The sail is attached to the pivot arm 11 by a bracket 12a that is riveted or otherwise fastened to the sail as shown. The bracket is secured to the pivot arm 11 by a bolt 12b and a wingnut 12c in this way, the sail can be tightened for use and loosened for folding for storage. Note that FIG. 7 also shows part of the counterweight 30 and the pivot assembly cover 41.

Figure 8:
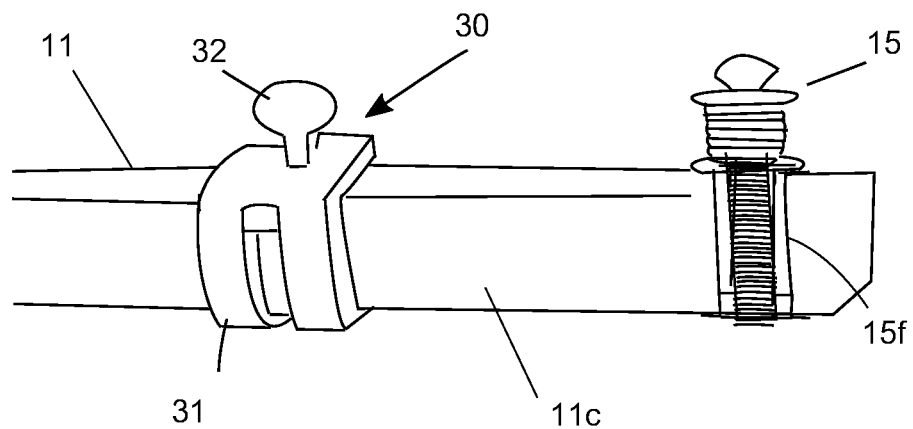
FIG. 8 is a detail view of the spring clip and counter weight assemblies.

FIG. 8 is a detail view of the spring clip and counterweight assemblies. In this figure the distal end 11c of the pivot arm 11 is shown. The counterweight 30 is shown attached to the pivot arm. The counterweight 30 consists of a formed body 31 and a thumbscrew 32. FIG. 8 also shows the assembled spring clip release assembly, discussed below in regards to FIG. 9.

Figure 10:
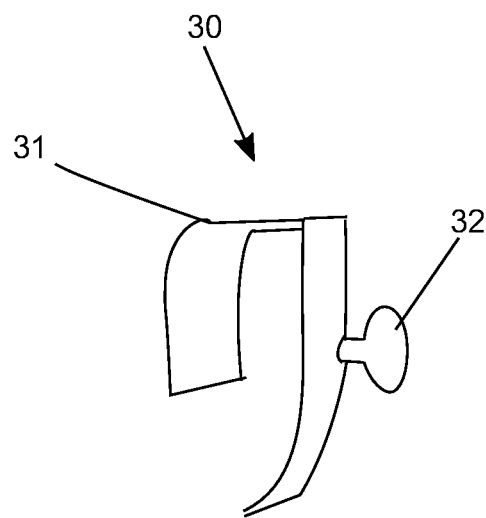
FIG. 10 is a side view of the counter weight.

FIG. 10 is a side view of the counterweight 30. note that the counterweight 30 is made of light weight metal and is formed to wraparound the pivot arm 11 as shown. Note that the counterweight 30 can slide on the pivot arm to be placed at the desired location, where it can then be locked by turning the thumb screw 32.

Figure 9:
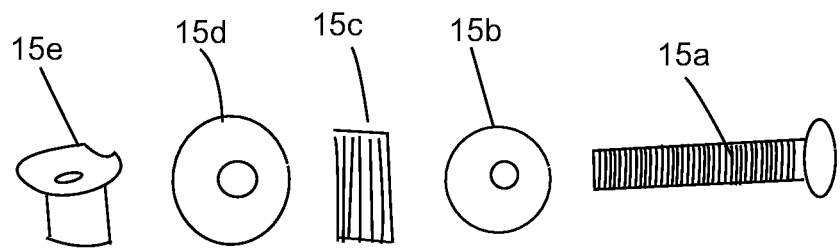
FIG. 9 is a detail view of the parts of the spring clip.

FIG. 9 is a detail view of the parts of the spring clip release assembly. FIG. 8 shows the spring clip release 15. This clip release 15 is used to attach the line coming from the spool to the pivot arm 11. See, FIG. 1. The spring clip parts are shown in FIG. 9. The parts for the spring clip release 15 consist of a thumbscrew 15a, in the preferred embodiment, this is a 10-24×1½ inches long, a spring keeper washer 15b, which, in the preferred embodiment, is a ¼ inch finish waster silver soldered to a #10 washer, a spring 15c, a brass grommet 15d, and a 10-24 T-nut 15e. The tee nut is placed in the pivot arm 11, the washer 15b, spring, 15c, and a brass grommet 15d are placed on the thumbscrew 15a, the assembly is then placed through a hole 15f (see, FIG. 8) the pivot arm and the thumbscrew is tightened into the T-nut 15e as shown.

The line 16 is brought up from the spool 17 and is slipped into the spring 15c, which holds the line. When a fish bites the lure and is hooked, the line is pulled from the spring 15c, alerting the fisher person that a fish has been caught.

Figure 11:
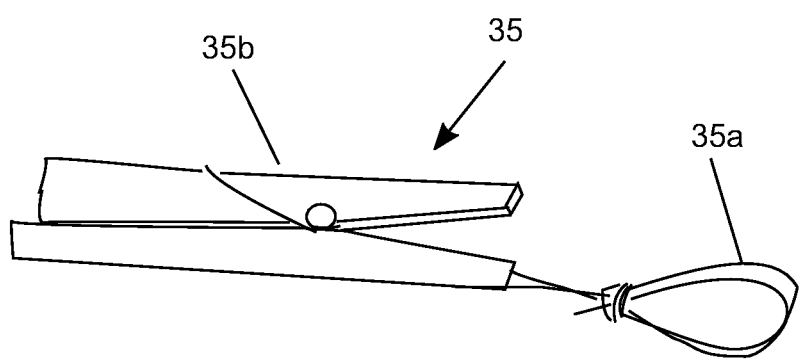
FIG. 11 is a detail of the clothes pin accessory.

FIG. 11 is a detail of the clothespin accessory 35. This is an alternative to using the spring clip release 15. The clothespin accessory 35 is used by placing the loop 35a over the spring so that it is held in place. The clothespin 35b is then suspended below the spring clip release 15. The fishing line 16 is brought up from the spool 17 as before and is then clipped into the clothespin 35b, When a fish strikes, the fish pulls the line from the clothespin as a signal.

Figure 12:
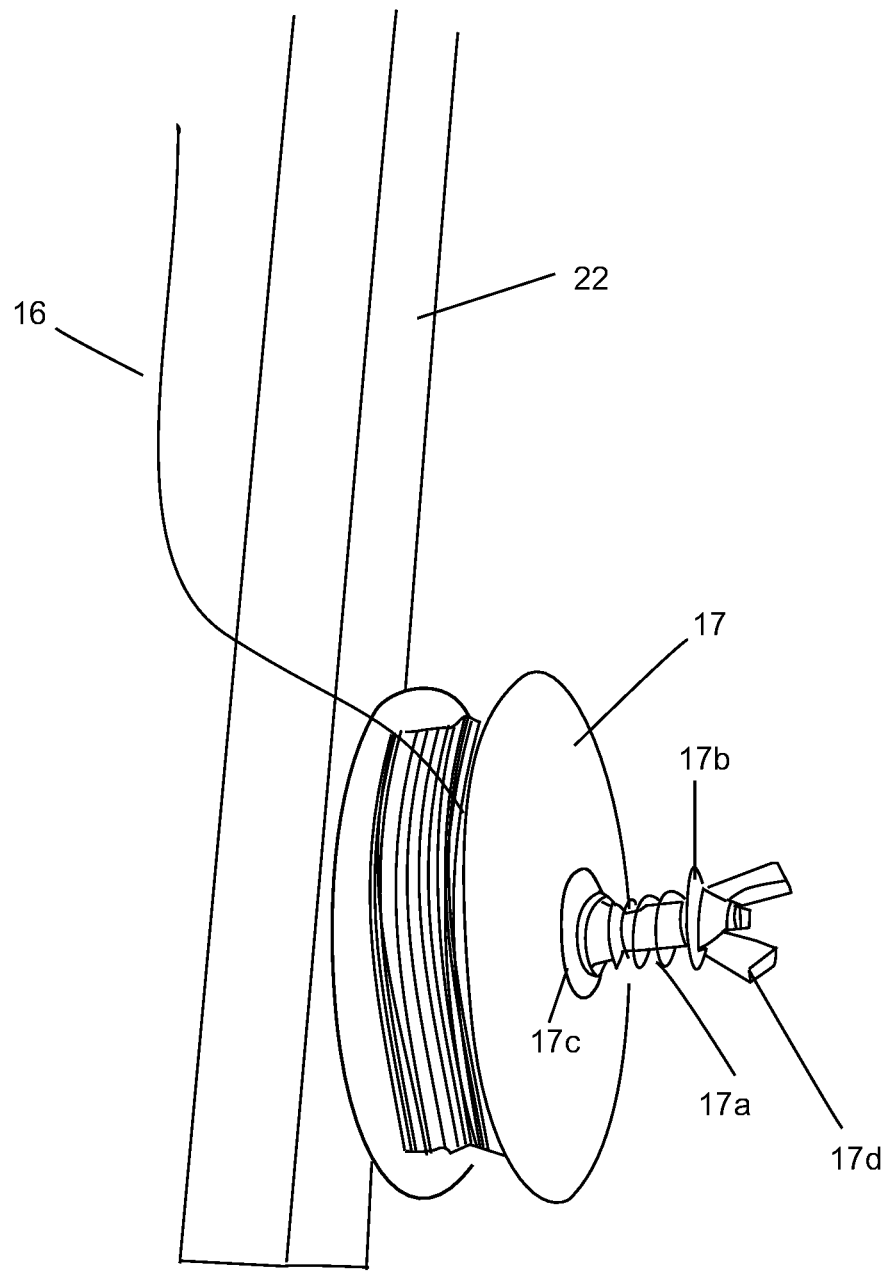
FIG. 12 is a detail of the reel as mounted on the reel arm.

FIG. 12 is a detail of the spool 17 as mounted on the spool arm 22. The spool 17 is fitted to the arm 22 by an assembly of hardware, which is shown in FIGS. 13, 14 and 15.

FIG. 13 is a detail of the spool arm 22 with the spool 17 removed. Here, a ¼-20×3½ inch carriage bolt 36a is shown held in place by a nut 36b FIG. 14 is a front view of the spool. 17. FIG. 15 is a detail of the spool mounting hardware. Here, a spring 17a is shown along with a washer 17b, a ¼ inch T-nut 17c that acts as a lock nut and a spring keeper, and a wingnut 17d, FIG. 12 shows the assembled. Looking at FIG. 12, there is the spool arm 22 with the carriage bolt 36a and nut 36b, onto which the spool 17 is fed. The T-nut 17c is placed against the spool. The spring 17a is then placed over the bolt 36a topped by the washer 17b and the wingnut 17d. In this way, the assembly can tighten or loosen the spool on the bolt 36a.

Figure 16:
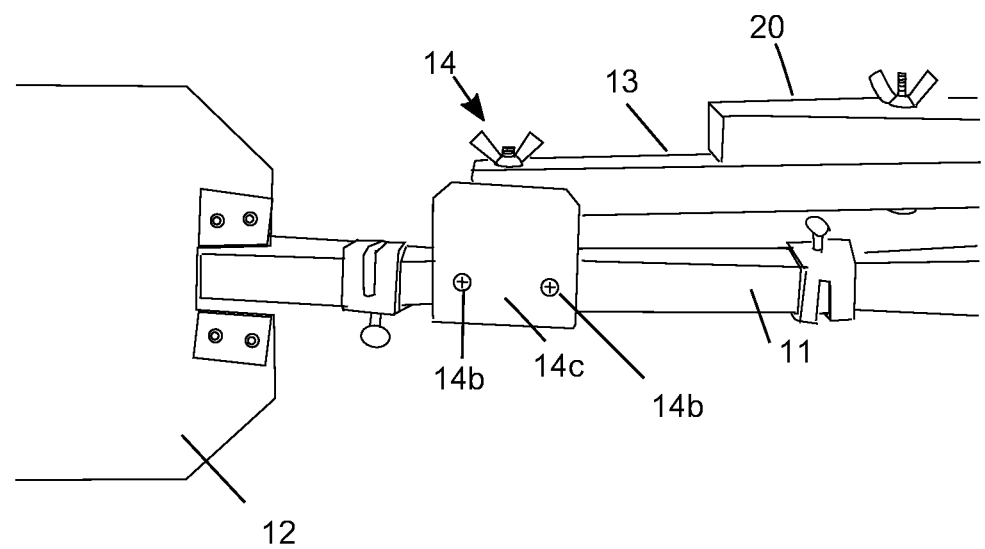
FIG. 16 is a detail of the pivot assembly.

FIG. 16 is a detail of the pivot assembly 14. This assembly is the point about which the pivot arm 22 actually pivots. It is spring loaded and can be tightened to reduce the amount of pivot or loosened to allow for greater movement of the pivot arm 22. In the preferred embodiment, the pivot assembly 14 has several parts, which are discussed below. As shown in this figure, the assembly 14 is covered by a pivot cover 14a, which is made of galvanized sheet metal and is nominally 2¼ inches by 2¼ inches. This cover protects the mechanism from ice, snow, water and dirt. It is important that this pivot not freeze as it would stop the pivoting action of the device. The cover 14a is held in place by screws 14b or similar fasteners.

Figure 17:
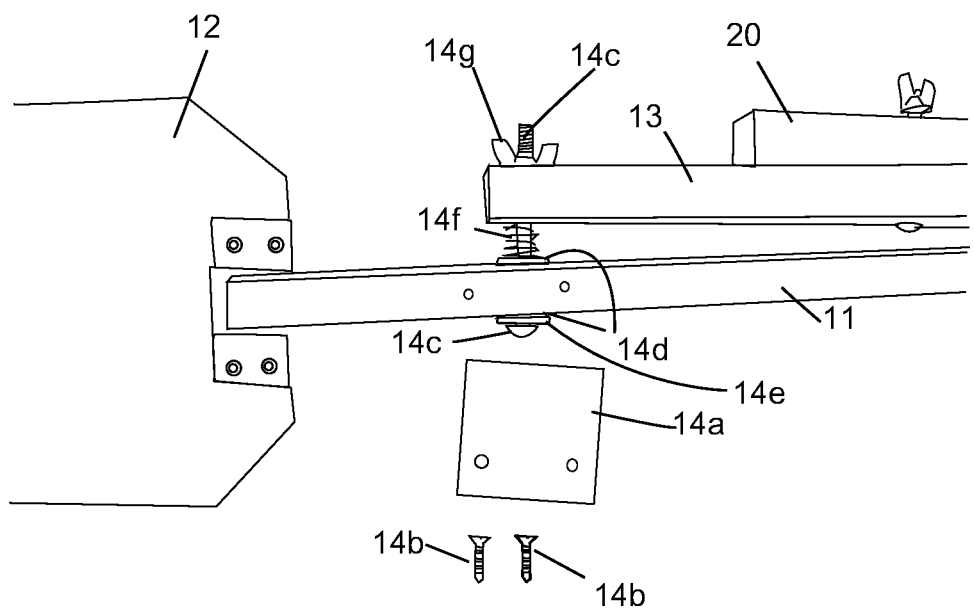
FIG. 17 is a detail of the pivot assembly with the cover removed.

FIG. 17 is a detail of the pivot assembly with the cover 14a removed. Here, details of the pivot assembly 14 are shown. First, the hole that is drilled through the pivot arm 22 is 5/16 inches in diameter. This is 1/16 inches larger than the bolt 14c, which is ¼ inch. T-nuts 14d are installed on the inside and outside of the pivot arm 22 as shown. On the outside of the arm, A nylon washer 14e is placed at the top end of the bolt. A spring 14f is positioned over the bolt, between the pivot arm 22 and the pivot support 13 as shown. The bolt 14c then passes through the pivot support 13, where it is held by a wingnut 14g. The spring 14e is called a return to neutral spring because if causes the pivot arm 22 to return to a neutral position after then wind blows the sales. In this way, the pivot arm is always positioned to catch the wind to make the hook or lure jig. The wing nut allows the user to adjust the spring force to control the amount of flex or pivot there is in the pivot arm 22.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. An ice fishing jig comprising:
    a) a solid disk base having a top, a bottom and an opening therein to allow fishing line to pass through, and also having at least one viewing window having a transparent pane thereon;
    b) a pivot support, having a proximate end and a distal end, wherein the pivot support is hingably attached to said disk base and extends upwardly therefrom;
    c) a pivot arm, having a proximate end, a distal end and a pivot point, wherein said pivot point is a point between said proximate end and said distal end, said pivot arm being pivotably attached to said pivot support at said pivot point;
    d) a sail attached to the distal end of said pivot arm;
    e) a clip release, attached to the proximate end of the pivot arm;
    f) a spool, extending downwardly from said disk base and having a quantity of fishing line thereon, wherein a portion of a length of said fishing line passes through the opening in said disk base and is attached to said clip release such that the remainder of the length of fishing line passes back through the opening in said disk base below said disk base; and
    g) a lure, attached to an end of the remainder of the length of fishing line.

2. The ice fishing jig of claim 1 wherein the pivot arm is configured to move when wind blows and causes said sail to move said pivot arm, thereby causing said lure to move.

3. The ice fishing jig of claim 1 wherein the disk base further comprises a feed-through slot forming an opening having two sides, an open channel therebetween, and an open end.

4. The ice fishing jig of claim 3 wherein the feed through slot is in communication with the opening formed therein.

5. The ice fishing jig of claim 4 wherein the feed through slot is covered by a feed through slot cover.

6. The ice fishing jig of claim 5 wherein the feed through slot cover has a first part that is wrapped around one of said two sides, and a second part that is wrapped around the other of the two sides such that the channel remains open.

7. The ice fishing jig of claim 5 wherein the feed through slot cover is made of a material selected from the group of nylon and vinyl.

8. The ice fishing jig of claim 1 further comprising a chatter stick secured to the bottom of said disk base such that said chatter stick is positioned in the center of the solid disk base.

9. The ice fishing jig of claim 1 wherein the device is foldable for storage.

10. The ice fishing jig of claim 1 wherein the clip release comprises:
   a) a thumbscrew;
   b) a spring keeper washer;
   c) a spring;
   d) a brass grommet; and
   e) a 10-24 T-nut;
   f) wherein the tee nut is placed in the pivot arm and the washer, spring, and brass grommet are placed on the thumbscrew, forming a thumbscrew assembly, which is then placed through a hole formed in the pivot arm such that the thumbscrew assembly is tightened into the T-nut.

11. The ice fishing jig of claim 1 wherein the clip release further comprises: a clothespin, suspended below the clip release, wherein the length of fishing line is brought up from the spool and is then clipped into the clothespin.

12. The ice fishing jig of claim 8 wherein the chatter stick has a length.

13. The ice fishing jig of claim 12 wherein the chatter stick length fits a 6 inch hole in the ice.

14. The ice fishing jig of claim 12 wherein the chatter stick length fits an 8 inch hole in the ice.

15. The ice fishing jig of claim 12 wherein the chatter stick length fits a 10 inch hole in the ice.

16. The ice fishing jig of claim 1 further comprising at least one counterweight movably secured to said pivot arm.

\* \* \* \* \*